(12) United States Patent
Niwa et al.

(10) Patent No.: US 11,330,497 B2
(45) Date of Patent: May 10, 2022

(54) COMMUNICATION CONTROL APPARATUS, CONTROL METHOD THEREOF, AND STORAGE MEDIUM

(71) Applicant: KDDI CORPORATION, Tokyo (JP)

(72) Inventors: Tomonobu Niwa, Fujimino (JP); Koutarou Ichikawa, Fujimino (JP); Takeshi Kitahara, Fujimino (JP)

(73) Assignee: KDDI CORPORATION, Tokyo (JP)

(*) Notice: Subject to any disclaimer, the term of this patent is extended or adjusted under 35 U.S.C. 154(b) by 51 days.

(21) Appl. No.: 16/923,736

(22) Filed: Jul. 8, 2020

(65) Prior Publication Data

US 2020/0336965 A1    Oct. 22, 2020

Related U.S. Application Data

(63) Continuation of application No. PCT/JP2018/032844, filed on Sep. 5, 2018.

(30) Foreign Application Priority Data

Feb. 22, 2018 (JP) .............................. JP2018-029802

(51) Int. Cl.
*H04W 36/32* (2009.01)
*H04W 4/40* (2018.01)
(Continued)

(52) U.S. Cl.
CPC .............. *H04W 36/32* (2013.01); *H04W 4/40* (2018.02); *H04W 36/0061* (2013.01); *H04W 40/20* (2013.01); *H04W 72/0413* (2013.01)

(58) Field of Classification Search
CPC ... H04W 36/32; H04W 4/40; H04W 36/0061; H04W 40/20; H04W 72/0413;
(Continued)

(56) References Cited

U.S. PATENT DOCUMENTS

| 7,848,278 B2 | 12/2010 | Chen et al. |
| 10,779,189 B2 | 9/2020 | Khoryaev et al. |

(Continued)

FOREIGN PATENT DOCUMENTS

| JP | 2002-198886 A | 7/2002 |
| JP | 2008-027011 A | 2/2008 |

(Continued)

OTHER PUBLICATIONS

Extended European Search Report for European Patent Application No. 18906801.8 dated Mar. 19, 2021.

(Continued)

*Primary Examiner* — Marisol Figueroa
(74) *Attorney, Agent, or Firm* — Thomas | Horstemeyer, LLP

(57) ABSTRACT

A communication controller (communication control apparatus) acquires, from an MEC node (NW information collection unit), cell transition information for each vehicle that moves in a plurality of cells formed by a plurality of base stations connected to the MEC node. The communication controller determines a vehicle group that is made up of a plurality of vehicles and is to be subjected to uplink transmission control for path-dependent data based on the acquired cell transition information. The communication controller further performs, with respect to the determined vehicle group, transmission control for limiting uplink transmission of path-dependent data to a portion of vehicles that belong to the vehicle group.

22 Claims, 8 Drawing Sheets

(51) Int. Cl.
*H04W 36/00* (2009.01)
*H04W 40/20* (2009.01)
*H04W 72/04* (2009.01)

(58) Field of Classification Search
CPC .......... H04W 36/0009; H04W 72/048; H04W 48/06; H04W 48/04; H04W 4/44
See application file for complete search history.

(56) References Cited

U.S. PATENT DOCUMENTS

| | | |
|---|---|---|
| 2008/0095134 A1 | 4/2008 | Chen et al. |
| 2018/0242190 A1 | 8/2018 | Khoryaev et al. |

FOREIGN PATENT DOCUMENTS

| | | |
|---|---|---|
| JP | 2010-507971 A | 3/2010 |
| WO | 2017/052690 A1 | 3/2017 |
| WO | 2019163168 A1 | 8/2019 |

OTHER PUBLICATIONS

ETSI, Multi-access Edge Computing (MEC); Study on MEC Support for V2X Use Cases, Draft ETSI GR MEC 022, vol. ISG MEC Multi-access Edge Computing, No. V1.2.5, Retrieved from the Internet: URL:docbox.etsi.org/ISG/MEC/70-Draft/0022V2XSupport/MEC-0022V2X.Supportv125/MEC-022V2X_Support-v-1_2_5-rm.docx, Jan. 3, 2018, pp. 1-18, XP014303977.

KDDI Corporation et al., Saguna Networks Ltd., MEC022_V2X_key_issue, ETSI Draft; MEC(17) 000634r2, European Telecommunications Standards Institute (ETSI), 650, Route Des Lucioles F-06921 Sophia-Antipolis; France, vol. ISG MEC Multi-access Edge Computing, pp. 1-2, Retrieved from the Internet: URL: docbox.etsi.org/ISG/MEC/05-Contributions/2017/MEC(17)000634r2_MEC022_V2X_key_issue.docx, Dec. 13, 2017, XP014305295.

ETSI GS MEC 002 V1.1.1 (Mar. 2016): Mobile Edge Computing (MEC); Technical Requirements, [online], [accessed Feb. 19, 2018], Internet <URL:http://www.etsi.org/deliver/etsi_gs/MEC/001_099/002/01.01.01_60/gs_MEC002v010101p.pdf>, p. 29.

International Search Report for PCT/JP2018/032844 dated Nov. 27, 2018.

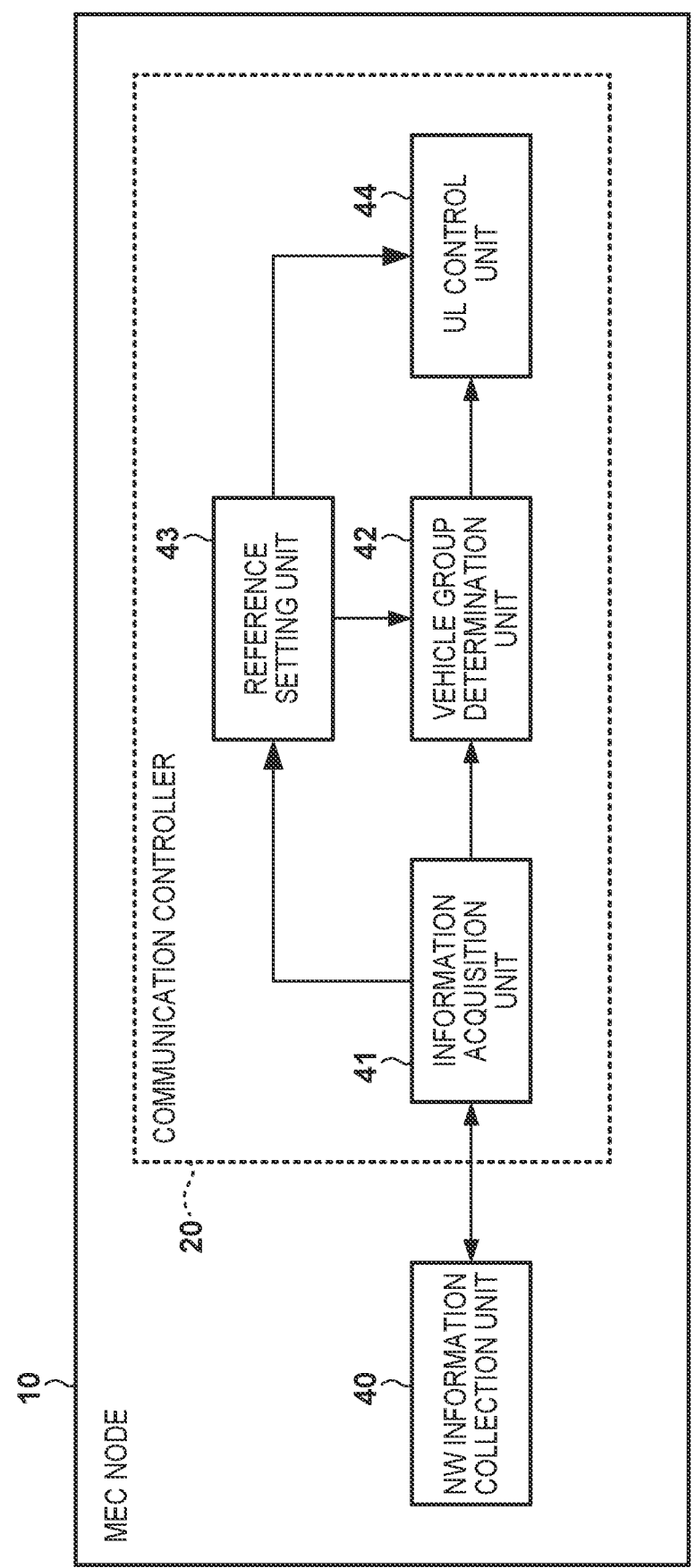

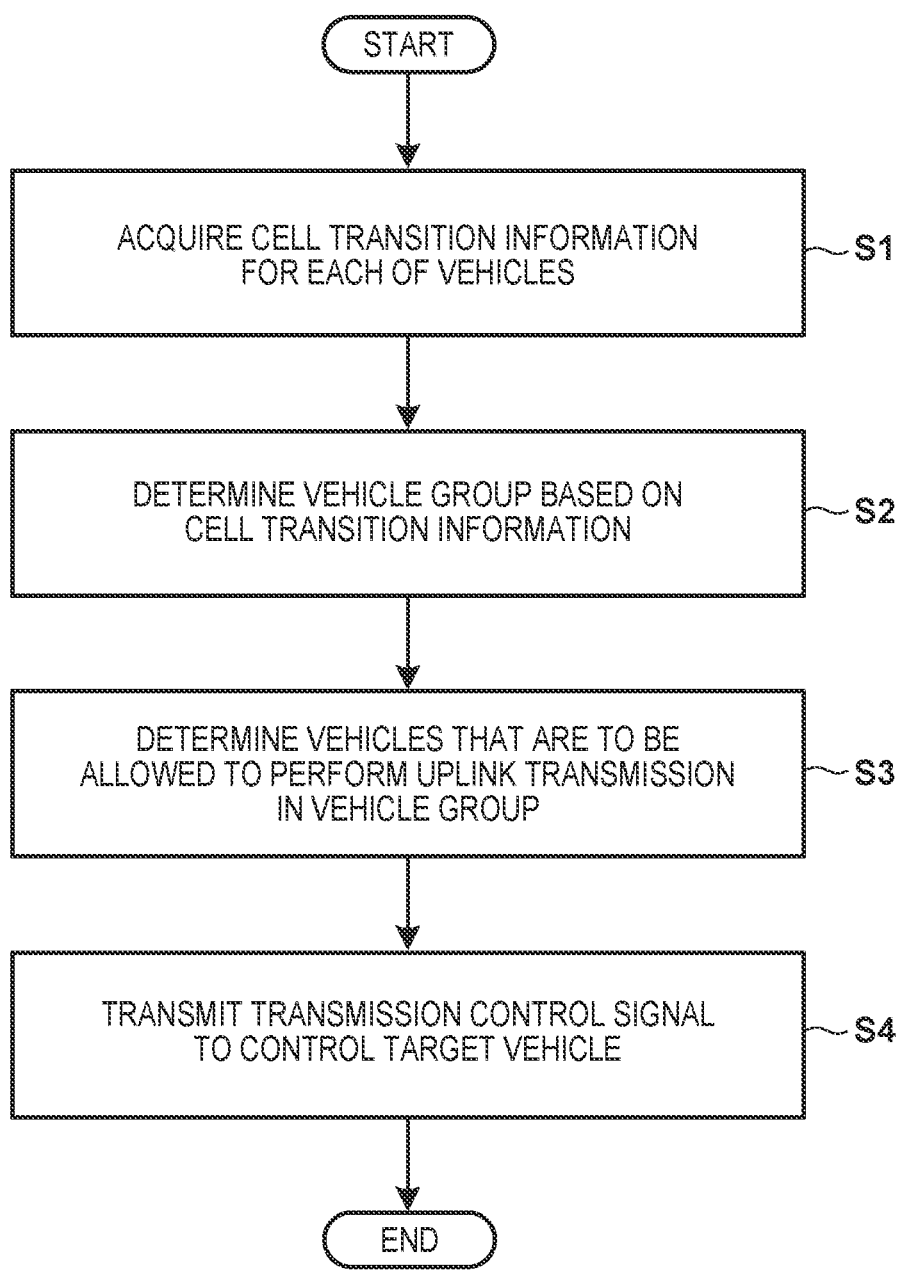

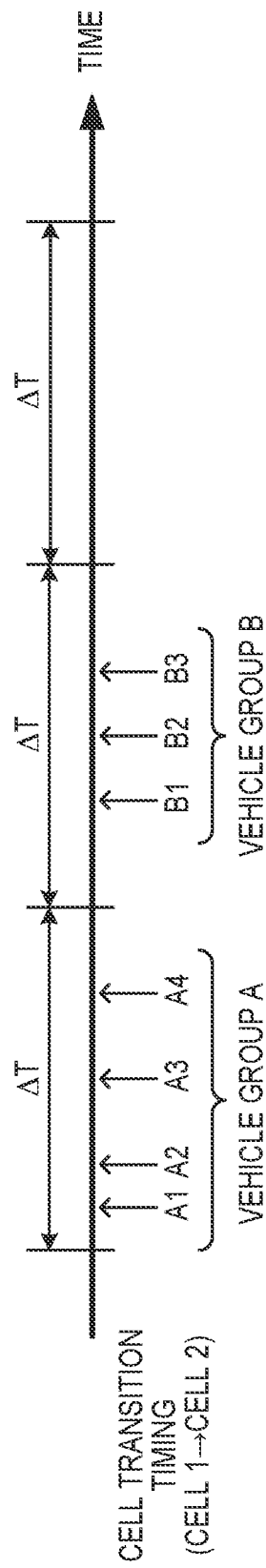

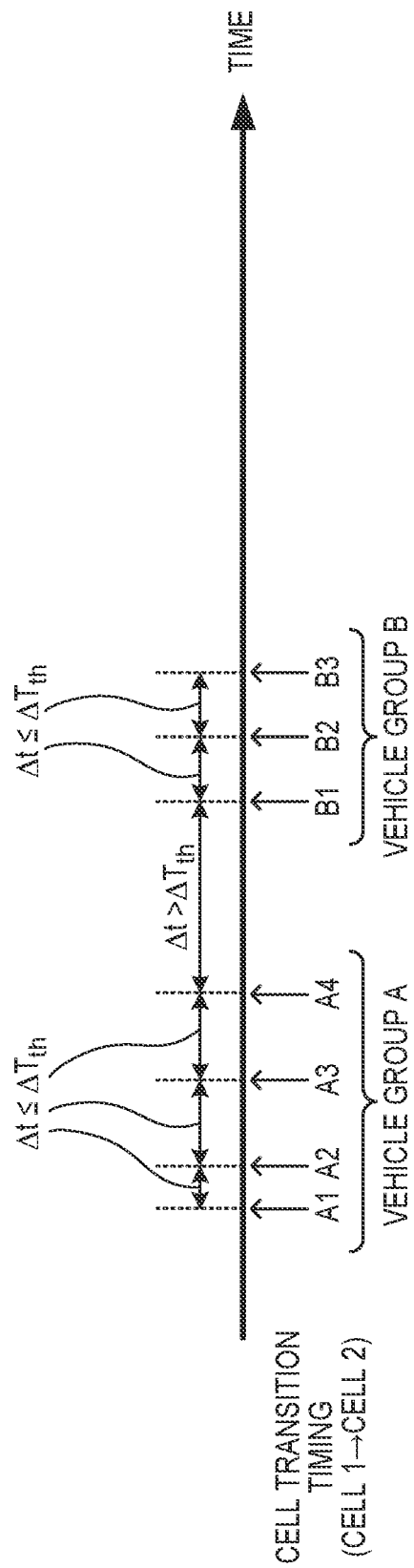

COMMUNICATION CONTROL APPARATUS, CONTROL METHOD THEREOF, AND STORAGE MEDIUM

CROSS-REFERENCE TO RELATED APPLICATIONS

This application is a continuation of International Patent Application No. PCT/JP2018/032844 filed on Sep. 5, 2018, which claims priority to and the benefit of Japanese Patent Application No. 2018-029802 filed on Feb. 22, 2018, the entire disclosures of which are incorporated herein by reference.

TECHNICAL FIELD

The present invention relates to a communication control apparatus for controlling uplink communication from vehicles that are connected to a mobile network, a control method of the same, and a storage medium.

BACKGROUND ART

Connected cars, which are automobiles that have communication functionality and function as an ICT terminal, have become increasingly prevalent. In order to improve automobile safety and comfort, information related to the automobile, the driver, and the surroundings is exchanged between connected cars and a data center so as to be accumulated in and analyzed by the data center. Connected cars transmit (upload) a wide variety of types of information (e.g., vehicle control/operation data, driver operation data, dynamic map data, and drive recorder video data) to a network. The use of a cellular network is envisioned as the mode of connection of such connected cars to the network.

An increase in the number of connected cars is thought to lead to an increase in uplink traffic for the accumulation of vehicle-generated data in the data center via the network. For example, if a localized increase in uplink traffic occurs due to a traffic jam that includes connected cars, it is possible for uplink communication congestion to occur. In this case, the quality (QoS) of communication for the connected cars can possibly degrade.

MEC (Multi-access Edge Computing; e.g., see NPL1), which has been standardized by the ETSI (European Telecommunications Standards Institute), has been under consideration as a technology for controlling uplink traffic bound for a data center. The use of MEC to perform processing such as the compression of data transmitted by vehicles is anticipated to reduce the amount of traffic bound for a host network.

CITATION LIST

Patent Literature

NPL1: ETSI GS MEC 002 V1.1.1 (2016 March): Mobile Edge Computing (MEC); Technical Requirements, [online], [accessed Feb. 19, 2018], Internet <URL:http://www.etsi.org/deliver/etsi_gs/MEC/001_099/002/01.01.01_60/gs_MEC002v010101p.pdf>, p. 29

SUMMARY OF INVENTION

Technical Problem

However, in the case of a communication network such as a cellular network, more wireless resources are generally allocated to downlink communication than uplink communication in a wireless segment between a mobile station and a base station. In such a communication network, an increase in the number of connected cars can cause congestion to occur more easily in uplink communication in the wireless segment. For this reason, it is not sufficient to merely reduce the amount of traffic in a segment upstream of the wireless segment, and there is demand to also be able to prevent congestion in communication in the wireless segment.

The present invention was achieved in light of the foregoing problems. An object of the present invention is to provide technology for appropriately controlling the uplink transmission of data from a vehicle with use of edge computing in order to prevent congestion in communication in a wireless segment.

Solution to Problem

According to one aspect of the present invention, there is provided a communication control apparatus for provision in a network that includes a plurality of base stations and a node apparatus that is for edge computing and is connected to the plurality of base stations, comprising: an acquisition unit configured to acquire, from the node apparatus, cell transition information that indicates transitions between cells by each vehicle that moves in a plurality of cells formed by the plurality of base stations; a determination unit configured to determine a vehicle group that is made up of a plurality of vehicles and is to be subjected to transmission control, based on the cell transition information acquired by the acquisition unit; and a control unit configured to control uplink transmission of data from the vehicle group determined by the determination unit, the control unit limiting vehicles that perform uplink transmission of path-dependent data, which is dependent on a movement path of a vehicle, to a portion of vehicles that belong to the vehicle group.

According to another aspect of the present invention, there is provided a control method of a communication control apparatus for provision in a network that includes a plurality of base stations and a node apparatus that is for edge computing and is connected to the plurality of base stations, the method comprising: acquiring, from the node apparatus, cell transition information that indicates transitions between cells by each vehicle that moves in a plurality of cells formed by the plurality of base stations; determining a vehicle group that is made up of a plurality of vehicles and is to be subjected to transmission control, based on the acquired cell transition information; and controlling uplink transmission of data from the determined vehicle group, by limiting uplink transmission of path-dependent data, which is dependent on a movement path of a vehicle, to a portion of vehicles that belong to the vehicle group.

According to still another aspect of the present invention, there is provided a non-transitory computer-readable storage medium storing a program for causing a computer to execute a control method of a communication control apparatus for provision in a network that includes a plurality of base stations and a node apparatus that is for edge computing and is connected to the plurality of base stations, the method comprising: acquiring, from the node apparatus, cell transition information that indicates transitions between cells by each vehicle that moves in a plurality of cells formed by the plurality of base stations; determining a vehicle group that is made up of a plurality of vehicles and is to be subjected to transmission control, based on the acquired cell transition information; and controlling uplink transmission of data from the determined vehicle group, by limiting uplink transmission of path-dependent data, which is dependent on a movement path of a vehicle, to a portion of vehicles that belong to the vehicle group.

Advantageous Effects of Invention

According to the present invention, it becomes possible to appropriately control the uplink transmission of data from a vehicle with use of edge computing in order to prevent congestion in communication in a wireless segment.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The attached drawings are included in and constitute a part of the specification, illustrate embodiments of the present invention, and are used together with the description thereof to explain the principle of the present invention.

FIG. 4 is a block diagram showing an example of the function configuration of an MEC node.

FIG. 5 is a flowchart showing a procedure of processing executed by the communication controller.

FIG. 6A is a diagram showing an example of vehicle group determination processing.

FIG. 6B is a diagram showing an example of vehicle group determination processing.

DESCRIPTION OF EMBODIMENTS

Figure 1:
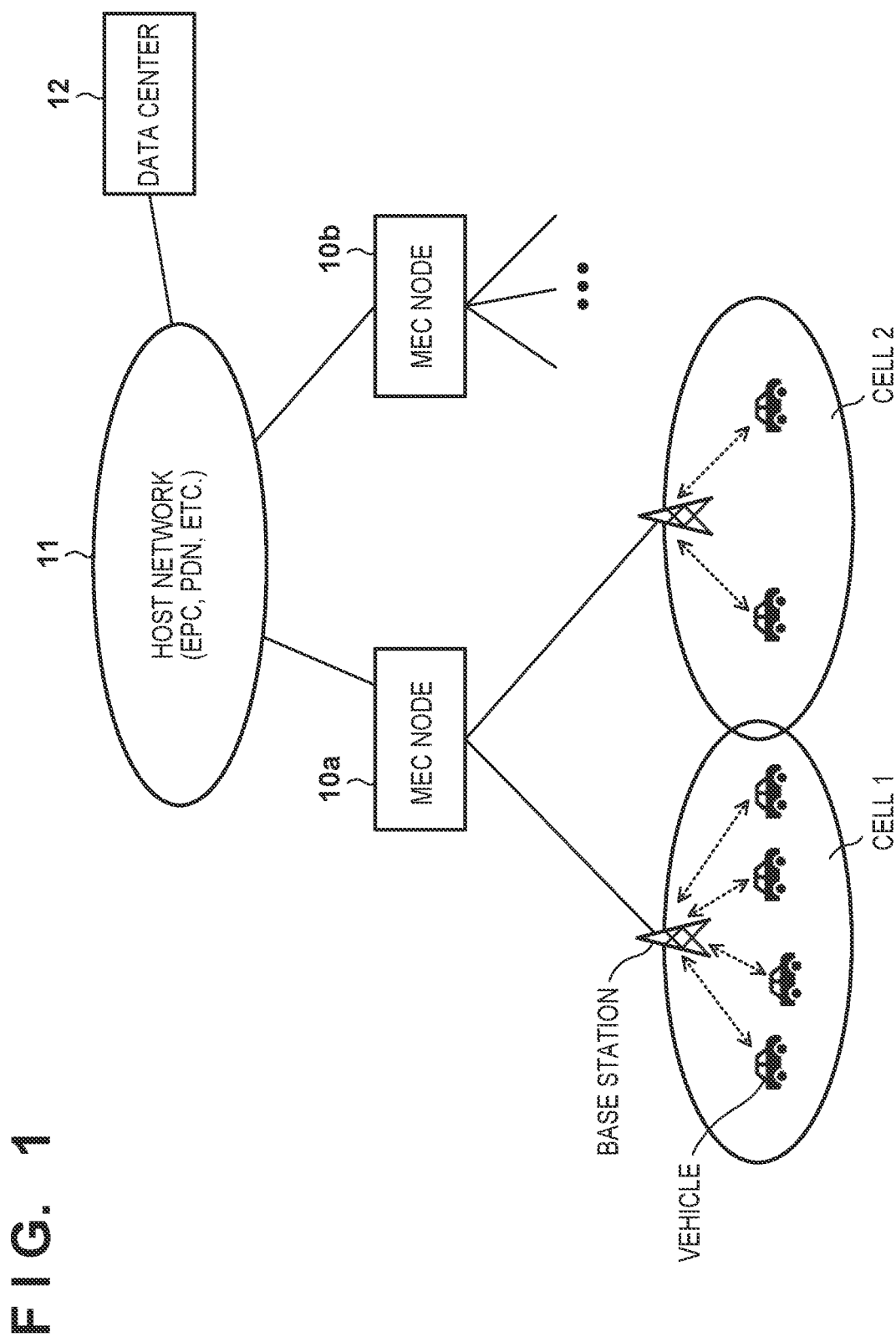
FIG. 1 is a diagram showing an example of the configuration of a communication network that includes MEC nodes.

Hereinafter, an exemplary embodiment of the present invention is described with reference to the drawings. Note that constituent elements not necessary for the description of the embodiment are not shown in the drawings.

Network Configuration

FIG. 1 is a diagram showing an example of the configuration of a communication network that includes MEC nodes according to an embodiment of the present invention. MEC nodes 10 (MEC nodes 10a and 10b) of the present embodiment are each a node apparatus for edge computing (MEC). Each MEC node 10 is provided with a communication controller (communication controller 20 in FIG. 2) that functions as an example of a communication control apparatus of the present invention.

As shown in FIG. 1, each MEC node 10 is connected to multiple base stations and a host network 11. The MEC node 10 manages the base stations connected thereto, and also manages the cells formed by each of the base stations. For example, the MEC node 10a manages cells 1 and 2. The MEC node 10 provides a service (e.g., a vehicle autonomous traveling assistance service) to wireless terminals such as vehicles that are moving (traveling) in the cells formed by the connected base stations.

When a vehicle that has a function for connecting to a communication network (i.e., a connected car) is traveling in a cell formed by a base station, the vehicle can make a wireless connection with the base station that forms the cell. After making a wireless connection with the base station, the vehicle can access the MEC node 10 and the host network 11 via the base station, and can also access a data center 12 via the host network 11. Accordingly, each vehicle can transmit (upload) generated data (e.g., vehicle control/operation data, driver operation data, dynamic map data, and drive recorder video data) to the data center 12 via the connected base station.

Although only the two MEC nodes 10a and 10b exist in the configuration example in FIG. 1, any number of MEC nodes can be provided in the communication network. Also, if an LTE (Long Term Evolution) or LTE-Advanced network is envisioned as the communication network, each base station is an eNodeB, and the host network 11 includes an EPC (Evolved Packet Core), which is a core network. The host network 11 may further include an external network that is upstream of the core network, such as a packet data network (PDN) or the Internet.

Note that the communication network to which the present invention is applied may be a mobile network other than an LTE/LTE-Advanced network. For example, the communication network may be a 5th generation (5G) mobile network, which is being standardized by the 3rd Generation Partnership Project (3GPP).

Overview of Processing Performed by Communication Control Apparatus

In a communication network such as a mobile network to which connected cars are connected, an increase in the number of connected cars is accompanied by an increase in uplink traffic, which can lead to congestion in uplink communication in the wireless segment, as described above. For example, if a traffic jam occurs in a cell formed by a base station, and many vehicles attempt to upload data to the data center 12 via the base station at the same time, congestion can occur in the uplink communication. This leads to a degradation in the QoS of communication for the connected cars.

Figure 2:
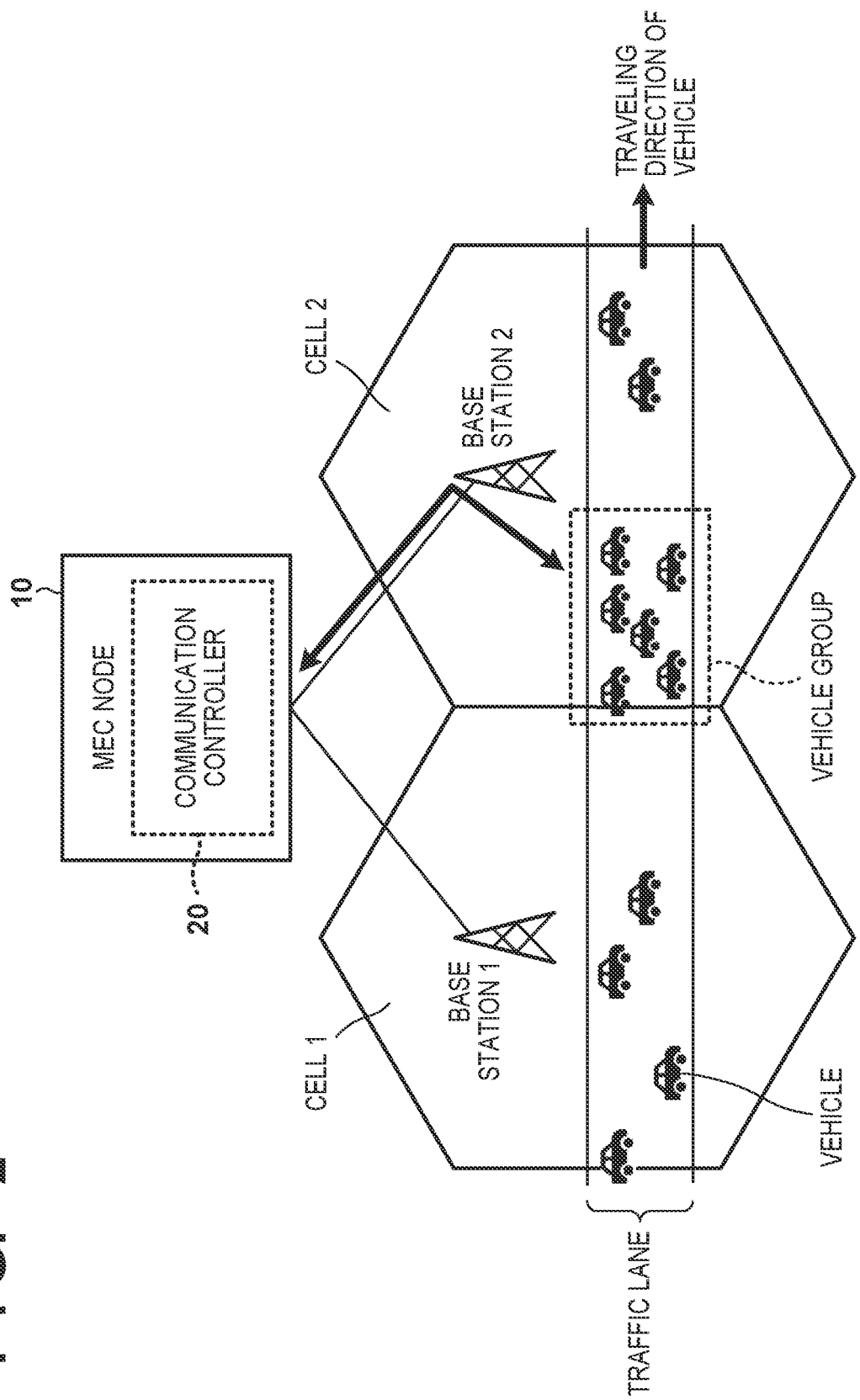
FIG. 2 is a diagram showing an example of a vehicle group determined by a communication control apparatus (communication controller).

In view of this, in order to prevent the above-described congestion in uplink communication, the communication control apparatus according to the present embodiment determines vehicle groups, which are groups of vehicles that are moving (traveling) at relatively close positions to each other in the cells managed by the MEC nodes 10. FIG. 2 is a diagram showing an example of a vehicle group determined by the communication control apparatus. In the present embodiment, the communication controller 20 provided in each MEC node 10 functions as the communication control apparatus, as shown in FIG. 2. The vehicle group determination made by the communication controller 20 is made based on cell transition information that can be acquired by the MEC node 10 and indicates transitions between cells for each vehicle. The example of FIG. 2 shows a vehicle group made up of vehicles that have transitioned from the cell 1 to the cell 2, in accordance with a determination made based on the timings of the transitions of the vehicles from the cell 1 to the cell 2.

The data generated by the vehicles in the determined vehicle group includes a specific type of data that is similar between vehicles, and the communication controller 20 furthermore performs communication control such that only a portion of the vehicles in the vehicle group are allowed to upload (transmit) the specific type of data. The specific type of data is path-dependent data that is not vehicle-dependent, but rather is dependent on the movement path of a vehicle, such as data acquired by a drive recorder or LIDAR (Light Detection and Ranging) data. In the case of such path-dependent data, the same data is generated by different vehicles if the vehicles move along the same path in the same time period. The vehicle group determined by the communication controller 20 can basically be said to include vehicles that moves along the same path in the same time period. For this reason, the communication controller 20 limits vehicles that perform the uploading (transmission) of such path-dependent data to only a portion of the vehicles in the determined vehicle group. Accordingly, it becomes possible to reduce the amount of data that is transmitted from the vehicle group (i.e., mitigate the overall uplink traffic) while also maintaining the amount of information in the data that is transmitted from the vehicle group.

The following describes examples of the configuration and specific processing procedure of the communication controller 20 of the MEC node 10 for realizing the above-described processing.

Configuration of MEC Node

Figure 3:
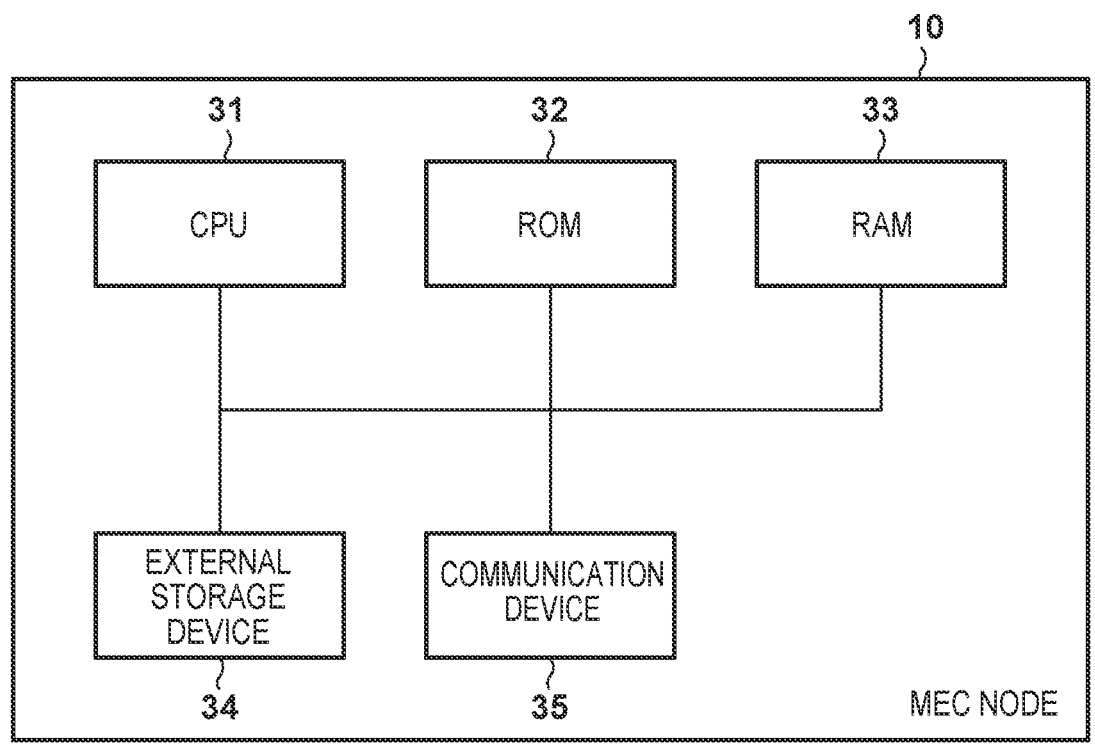
FIG. 3 is a block diagram showing an example of the hardware configuration of an MEC node.

FIG. 3 is a block diagram showing an example of the hardware configuration of the MEC node 10 according to the present embodiment. The MEC node 10 includes a CPU 31, a ROM 32, a RAM 33, an external storage device 34 (e.g., an HDD), and a communication device 35 (communication interface).

In the MEC node 10, a program that is stored in the ROM 32, the RAM 33, or the external storage device 34 and that realizes various functions of the MEC node 10 is executed by the CPU 31. Note that the CPU 31 may be replaced with one or more processors constituted by an ASIC (Application Specific Integrated Circuit), an FPGA (Field Programmable Gate Array), a DSP (Digital Signal processor), or the like.

Under control of the CPU 31, the communication device 35 performs communication with base stations that are connected to the MEC node 10 (communication with vehicles via the base stations), and communication with a node (e.g., the data center 12) connected to the host network 11. The MEC node 10 may have multiple communication devices 35 for different communication destinations.

FIG. 4 is a diagram showing an example of the configuration of the MEC node 10 according to the present embodiment. These functions of the MEC node 10 are logical functions realized by the hardware in FIG. 3 for example, and can be realized by the CPU 31 executing a program stored in the ROM 32 or the like. Note that the MEC node 10 may include dedicated hardware for executing such functions, or a configuration is possible in which some of such functions are executed by hardware, and other functions are executed by a computer running a program. Also, a configuration is possible in which all of the functions are executed by a computer and a program.

In the present embodiment, the MEC node 10 includes an NW (network) information collection unit 40, an information acquisition unit 41, a vehicle group determination unit 42, a reference setting unit 43, and a UL (uplink) control unit 44. In the present embodiment, the information acquisition unit 41, the vehicle group determination unit 42, the reference setting unit 43, and the UL control unit 44 constitute the communication controller 20 that serves as an example of the communication control apparatus.

The NW information collection unit 40 uses a function such as an RNI (Radio Network Information) service, which is defined in the MEC standard specifications, to collect communication information (network information) that indicates the communication state in each of the cells managed by the MEC node 10. The communication information includes cell transition information that indicates transitions (movement) between cells for each vehicle. The communication information can further include congestion information that indicates the degree of uplink congestion in each cell. The NW information collection unit 40 provides the collected communication information to the communication controller 20.

The information acquisition unit 41 of the communication controller 20 acquires, from the NW information collection unit 40, cell transition information for each of the vehicles that move through the cells managed by the MEC node 10. In the present embodiment, the information acquisition unit 41 uses an MEC API to acquire communication information that includes the cell transition information from the NW information collection unit 40. Note that the acquisition of the cell transition information is not limited to a method employing an MEC API.

Based on the cell transition information for each vehicle, acquired by the information acquisition unit 41, the vehicle group determination unit 42 determines a vehicle group that is made up of multiple vehicles and is to be subjected to uplink transmission control for path-dependent data. As will be described later, the vehicle group determination unit 42 can make the vehicle group determination based on at least the timings of transitions between cells for each vehicle, and/or past transitions between cells (movement paths) for each vehicle. The reference setting unit 43 sets reference values for use as a reference in the vehicle group determination made by the vehicle group determination unit 42. The reference values are a time interval $\Delta T$ and a threshold interval $\Delta T_{th}$, which will be described later with reference to FIGS. 6A and 6B.

The UL control unit 44 controls the uplink transmission of data from the vehicle group determined by the vehicle group determination unit 42. Specifically, the UL control unit 44 performs, with respect to the determined vehicle group, transmission control for limiting the uplink transmission of path-dependent data to a portion of the vehicles that belong to that vehicle group. In other words, the UL control unit 44 allows the uplink transmission of path-dependent data to be performed by only a portion of the vehicles that belong to the determined vehicle group. The UL control unit 44 temporarily prohibits the uplink transmission of path-dependent data by the remaining vehicles. The uplink transmission prohibition period is, for example, a period during which the prohibited vehicles belong to the determined vehicle group, or a period until a predetermined wait time has elapsed.

Processing Procedure of Communication Control Apparatus

Next, a specific procedure of processing executed by the communication controller 20 of the MEC node 10 is described based on the example of the network configuration shown in FIGS. 1 and 2. FIG. 5 is a flowchart showing a procedure of processing executed by the communication controller 20. The processing in FIG. 5 may be executed at any timing, such as being executed periodically, or being executed for a cell managed by the MEC node 10 if the degree of uplink congestion in the cell has become high (reached a predetermined level).

First, in step S1, the information acquisition unit 41 acquires, from the NW information collection unit 40, communication information that includes cell transition information for each vehicle that moves through the plurality of cells managed by the MEC node 10. The cell transition information includes information that indicates the timings of cell transition for each vehicle (in the example in FIG. 2, the timing of the transition from the cell 1 to the cell 2).

Next, in step S2, based on the cell transition information acquired by the information acquisition unit 41, the vehicle group determination unit 42 determines a vehicle group that is made up of multiple vehicles and that is to be subjected to uplink transmission control for path-dependent data. The vehicle group determination can be realized through the processing of any one of Examples 1 to 3 described below, or any combination thereof.

Example 1

FIG. 6A is a diagram showing Example 1 of vehicle group determination processing performed by the vehicle group determination unit 42. In this example, based on the cell transition information, the vehicle group determination unit 42 identifies vehicles that have transitioned from a first cell to a second cell, which are managed by the MEC node 10, within a pre-set time interval $\Delta T$, and determines a vehicle group made up of the identified vehicles as the vehicle group to be subjected to the transmission control.

In the example in FIG. 6A, four vehicles A1 to A4 transition from the cell 1 to the cell 2 within the first time interval $\Delta T$, and three vehicles B1 to B3 transition from the cell 1 to the cell 2 within the next time interval $\Delta T$. In this case, the vehicle group determination unit 42 determines the vehicles A1 to A4 as one vehicle group (vehicle group A), and determines the vehicles B1 to B3 as another vehicle group (vehicle group B).

The aforementioned time interval $\Delta T$ is set in advance by the reference setting unit 43. $\Delta T$ may be set as a fixed value. Alternatively, $\Delta T$ may be changed as necessary for each cell in accordance with the degree of congestion in the cell or the number of vehicles that belong to the cell.

Specifically, the reference setting unit 43 may set $\Delta T$ in accordance with the degree of congestion indicated by the congestion information included in the communication information acquired by the information acquisition unit 41. In the example in FIG. 6A, $\Delta T$ corresponding to the cell 2 is set in accordance with the degree of congestion in the cell 2. In this case, the reference setting unit 43 increases corresponding $\Delta T$ as the degree of congestion in the cell 2 is higher, for example. Setting a longer $\Delta T$ makes it possible to increase the number of vehicles that are included in the vehicle group determined by the vehicle group determination unit 42 (the vehicle group effective in the cell 2). This leads to a reduction in the number of vehicles that perform uplink transmission of path-dependent data in the cell 2 (i.e., a reduction in the amount of data transmitted from the vehicles).

Also, the reference setting unit 43 may identify the number of vehicles that belong to each cell based on the cell transition information, and set the time interval $\Delta T$ in accordance with the identified number of vehicles. In the example in FIG. 6A, the reference setting unit 43 sets $\Delta T$ corresponding to the cell 2 in accordance with the number of vehicles that belong to the cell 2. In this case, the reference setting unit 43 increases corresponding $\Delta T$ as the number of vehicles that belong to the cell 2 increases, for example.

Example 2

FIG. 6B is a diagram showing Example 2 of vehicle group determination processing performed by the vehicle group determination unit 42. In this example, based on the cell transition information, the vehicle group determination unit 42 identifies a time interval $\Delta t$ between the successive transitions of vehicles from a first cell to a second cell (in the example in FIG. 2, from the cell 1 to the cell 2) that are managed by the MEC node 10. The vehicle group determination unit 42 then determines, as the vehicle group to be subjected to the transmission control, a vehicle group made up of consecutive vehicles that have successively transitioned from the first cell to the second cell in a time interval that is less than or equal to a pre-set threshold interval $\Delta T_{th}$.

In the example in FIG. 6B, four consecutive vehicles from vehicle A1 to vehicle A4 successively transition from the cell 1 to the cell 2 in a time interval $\Delta t$ that is less than or equal to the threshold interval $\Delta T_{th}$. Thereafter, the time interval between the vehicle A4 and the next vehicle B1 exceeds the threshold interval $\Delta T_{th}$ ($\Delta t > \Delta T_{th}$). For this reason, the vehicle group determination unit 42 determines the vehicles A1 to A4 as one vehicle group (vehicle group A), and determines the vehicles from the vehicle B1 onward as another vehicle group. In this example, the three consecutive vehicles from the vehicle B1 to the vehicle B3 successively transition from the cell 1 to the cell 2 in a time interval $\Delta t$ that is less than or equal to the threshold interval $\Delta T_{th}$. For this reason, the vehicle group determination unit 42 determines the vehicles B1 to B3 as another vehicle group (vehicle group B).

The aforementioned threshold interval $\Delta T_{th}$ is set in advance by the reference setting unit 43. $\Delta T_{th}$ may be set as a fixed value. Alternatively, similarly to $\Delta T$ in Example 1, $\Delta T_{th}$ may be changed as necessary for each cell in accordance with the degree of congestion in the cell or the number of vehicles that belong to the cell. For example, the reference setting unit 43 may increase corresponding $\Delta T_{th}$ as the degree of congestion in the cell 2 is higher. Also, the reference setting unit 43 may increase corresponding $\Delta T_{th}$ as the number of vehicles that belong to the cell 2 increases. Setting a longer $\Delta T_{th}$ makes it possible to increase the number of vehicles that are included in the vehicle group determined by the vehicle group determination unit 42 (the vehicle group effective in the cell 2). This leads to a reduction in the number of vehicles that perform uplink transmission of path-dependent data in the cell 2 (i.e., a reduction in the amount of data transmitted from the vehicles).

Example 3

In Example 3, based on the cell transition information, the vehicle group determination unit 42 identifies, from among vehicles that have transitioned from a first cell to a second cell managed by the MEC node 10, vehicles that have made a predetermined number of cell transitions with respect to the same cells up to the second cell. The vehicle group determination unit 42 then determines, as the vehicle group to be subjected to the transmission control, a vehicle group made up of the identified vehicles. In this way, in this example, the vehicle group determination unit 42 extracts, as the vehicle group, the vehicles that have made the same cell transitions in the past.

Next, in step S3, the UL control unit 44 determines the vehicles that are to be allowed to perform uplink transmission of path-dependent data, in the vehicle group determined by the vehicle group determination unit 42. Specifically, with respect to a vehicle group made up of vehicles that have transitioned from a first cell to a second cell managed by the MEC node 10, the UL control unit 44 allows uplink transmission of path-dependent data to be performed by only a pre-set number of vehicles in order of earliest timing of transition to the second cell. In other words, the UL control unit 44 allows uplink transmission to be performed by the set number of vehicles in order from the first one of the vehicles that belong to the determined vehicle group. Note that information indicating the order of vehicle transition to the second cell can be provided to the UL control unit 44 by the vehicle group determination unit 42.

The reference setting unit 43 may set, in the UL control unit 44, the number of vehicles that are to be allowed to perform uplink transmission, in accordance with the degree of congestion in the second cell, which is indicated by the congestion information included in the communication information acquired by the information acquisition unit 41. Alternatively, the reference setting unit 43 may identify the number of vehicles that belong to the second cell, and set, in the UL control unit 44, the number of vehicles that are to be allowed to perform uplink transmission in accordance with the identified number of vehicles.

Lastly, in step S4, the UL control unit 44 transmits, via the base station, a transmission control signal for prohibiting the uplink transmission of path-dependent data, to vehicles other than the portion of vehicles allowed in step S3 among the vehicles that belong to the vehicle group determined by the vehicle group determination unit 42. Accordingly, the uplink transmission of path-dependent data is limited to only a portion of the vehicles that belong to the vehicle group. For example, with respect to the vehicles that are to be prohibited from performing uplink transmission, the UL control unit 44 prohibits the uplink transmission of path-dependent data by those vehicles while those vehicles belong to the vehicle group determined by the vehicle group determination unit 42. Alternatively, the UL control unit 44 may prohibit the uplink transmission of path-dependent data until a predetermined wait time elapses since the determination made by the vehicle group determination unit 42.

Figure 7:
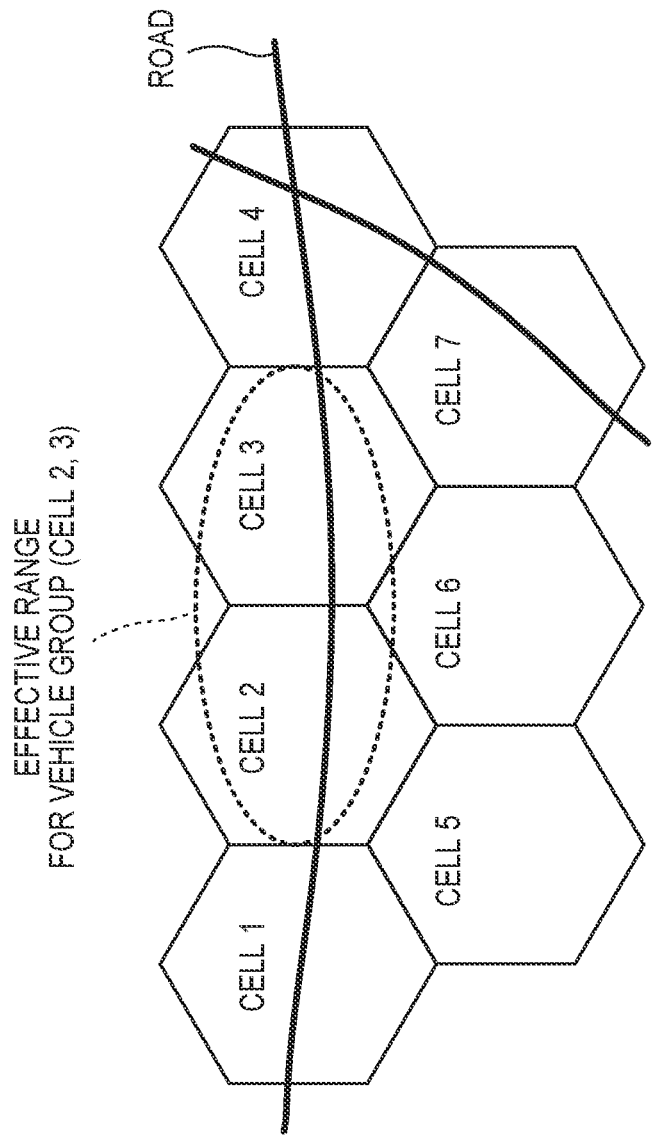
FIG. 7 is a diagram showing an example of an effective range for a determined vehicle group.

Also, the UL control unit 44 may set an effective range for a vehicle group determined by the vehicle group determination unit 42 (i.e., a cell range in which the vehicle group is to be subjected to uplink transmission control) so as to limit the effective range to the one cell for which the vehicle group determination was made (the cell 2 in the examples in FIGS. 2, 6A and 6B). Alternatively, the UL control unit 44 may set the effective range for the vehicle group so as to be the one cell for which the vehicle group determination was made, and one or more cells consecutively adjacent to the one cell. For example, in the example shown in FIG. 7, along a road passing through cells 1, 2, 3 and 4, cells 1 to 4 may be combined, and the cell 2 and the cell 3 adjacent thereto may be set as the effective range for the vehicle group. In the one or more cells set as the effective range for the vehicle group determined by the vehicle group determination unit 42, the UL control unit 44 performs the uplink transmission control with respect to that vehicle group as in the above descriptions.

As described above, in the present embodiment, the information acquisition unit 41 acquires, from the MEC node 10 (the NW information collection unit 40 in FIG. 4), cell transition information for each vehicle that moves in a plurality of cells formed by a plurality of base stations connected to the MEC node 10. Based on the vehicle cell transition information acquired by the information acquisition unit 41, the vehicle group determination unit 42 determines a vehicle group that is made up of multiple vehicles and is to be subjected to uplink transmission control for path-dependent data. Furthermore, the UL control unit 44 performs, with respect to the vehicle group determined by the vehicle group determination unit 42, transmission control in which uplink transmission of path-dependent data is limited to a portion of the vehicles that belong to the vehicle group.

In this way, according to the present embodiment, a vehicle group is determined, and the uplink transmission of path-dependent data is limited to a portion of the vehicles in the determined vehicle group, thus making it possible to reduce the amount of data transmitted from the vehicle group while also maintaining the amount of information in the data that is transmitted from the vehicle group. In other words, it is possible to reduce the amount of uplink traffic, and it is possible to prevent congestion in communication in the wireless segment. Therefore, according to the present embodiment, it becomes possible to use edge computing to appropriately control the uplink transmission of data from vehicles in order to prevent congestion in communication in the wireless segment.

Note that although the communication controller 20 that corresponds to the communication control apparatus is provided in the MEC node 10 in the embodiment described above, the communication control apparatus may be provided outside the MEC node 10. In this case, the communication control apparatus may be configured so as to be communicably connected to the MEC node 10 and to acquire the cell transition information from the MEC node 10.

Note that the communication control apparatus according to the present embodiment can be realized by a computer program for causing a computer to function as the communication control apparatus. The computer program can be distributed in the form of being stored on a computer-readable storage medium, or can be distributed via a network.

The present invention is not limited to the above embodiment, and various changes and modifications can be made without departing from the spirit and scope of the present invention. Therefore, to apprise the public of the scope of the present invention, the following claims are made.

The invention claimed is:

1. A communication control apparatus for provision in a network that includes a plurality of base stations and a node apparatus that is for edge computing and is connected to the plurality of base stations, the communication control apparatus comprising:
    at least one processor circuit with a memory comprising instructions, that when executed by the processor circuit, cause the at least one processor circuit to at least:
    acquire, from the node apparatus, cell transition information that indicates transitions between cells by each vehicle that moves in a plurality of cells formed by the plurality of base stations;
    determine a vehicle group that is made up of a plurality of vehicles and is to be subjected to transmission control, based on the acquired cell transition information; and
    control uplink transmission of data from the determined vehicle group wherein in the controlling, vehicles that perform uplink transmission of path-dependent data, which is dependent on a movement path of a vehicle, is limited to a portion of vehicles that belong to the determined vehicle group.

2. The communication control apparatus according to claim 1, wherein when executed by the processor circuit, the instructions further cause the at least one processor circuit to at least,
based on the cell transition information, identify a plurality of vehicles that have transitioned from a first cell to a second cell among the plurality of cells within a pre-set time interval, and determine a vehicle group made up of the identified vehicles as the vehicle group to be subjected to the transmission control.

3. The communication control apparatus according to claim 2, wherein when executed by the processor circuit, the instructions further cause the at least one processor circuit to at least:
acquire, from the node apparatus, congestion information that indicates a degree of uplink congestion in each of the plurality of cells, and
set the time interval in accordance with the degree of congestion indicated by the acquired congestion information.

4. The communication control apparatus according to claim 3, wherein
the time interval is increased as the degree of congestion is higher.

5. The communication control apparatus according to claim 2, wherein when executed by the processor circuit, the instructions further cause the at least one processor circuit to at least:
identify a number of vehicles that belong to the second cell based on the acquired cell transition information, and set the time interval according to the identified number of vehicles.

6. The communication control apparatus according to claim 5, wherein
the time interval is increased as the number of vehicles that belong to the second cell increases.

7. The communication control apparatus according to claim 1, wherein when executed by the processor circuit, the instructions further cause the at least one processor circuit to at least,
based on the cell transition information, identify a time interval between successive transitions of vehicles from a first cell to a second cell among the plurality of cells, and determine, as the vehicle group to be subjected to the transmission control, a vehicle group made up of consecutive vehicles that have successively transitioned from the first cell to the second cell in a time interval that is less than or equal to a pre-set threshold interval.

8. The communication control apparatus according to claim 7, wherein when executed by the processor circuit, the instructions further cause the at least one processor circuit to at least:
acquire, from the node apparatus, congestion information that indicates a degree of uplink congestion in each of the plurality of cells, and
set the threshold interval in accordance with the degree of congestion indicated by the acquired congestion information.

9. The communication control apparatus according to claim 8, wherein
the threshold interval is increased as the degree of congestion is higher.

10. The communication control apparatus according to claim 7, wherein when executed by the processor circuit, the instructions further cause the at least one processor circuit to at least:
identify a number of vehicles that belong to the second cell based on the acquired cell transition information, and set the threshold interval according to the identified number of vehicles.

11. The communication control apparatus according to claim 10, wherein
the threshold interval is increased as the number of vehicles that belong to the second cell increases.

12. The communication control apparatus according to claim 1, wherein when executed by the processor circuit, the instructions further cause the at least one processor circuit to at least,
based on the cell transition information, identify, from among vehicles that have transitioned from a first cell to a second cell among the plurality of cells, vehicles that have made a predetermined number of cell transitions with respect to the same cells up to the second cell, and determine a vehicle group made up of the identified vehicles as the vehicle group to be subjected to the transmission control.

13. The communication control apparatus according to claim 2, wherein when executed by the processor circuit, the instructions further cause the at least one processor circuit to at least:
perform, with respect to the determined vehicle group, uplink transmission control in the second cell.

14. The communication control apparatus according to claim 2, wherein when executed by the processor circuit, the instructions further cause the at least one processor circuit to at least:
perform, with respect to the determined vehicle group, uplink transmission control in the second cell and one or more cells consecutively adjacent to the second cell.

15. The communication control apparatus according to claim 1, wherein when executed by the processor circuit, the instructions further cause the at least one processor circuit to at least:
in the vehicle group made up of vehicles that have transitioned from a first cell to a second cell among the plurality of cells, allow uplink transmission of the path-dependent data to be performed by only a pre-set number of vehicles in order of earliest timing of transition to the second cell.

16. The communication control apparatus according to claim 15, wherein when executed by the processor circuit, the instructions further cause the at least one processor circuit to at least:
acquire, from the node apparatus, congestion information that indicates a degree of uplink congestion in each of the plurality of cells, and
set a number of vehicles to be allowed to perform uplink transmission of the path-dependent data, in accordance with the degree of congestion indicated by the acquired congestion information.

17. The communication control apparatus according to claim 15, wherein when executed by the processor circuit, the instructions further cause the at least one processor circuit to at least:
identify a number of vehicles that belong to the second cell based on the acquired cell transition information, and set a number of vehicles to be allowed to perform uplink transmission of the path-dependent data in accordance with the identified number of vehicles.

18. The communication control apparatus according to claim 1, wherein when executed by the processor circuit, the instructions further cause the at least one processor circuit to at least:

prohibit uplink transmission of the path-dependent data by vehicles in the vehicle group other than the portion of vehicles while belonging to the determined vehicle group.

19. The communication control apparatus according to claim 1, wherein when executed by the processor circuit, the instructions further cause the at least one processor circuit to at least:

prohibit uplink transmission of the path-dependent data by vehicles in the vehicle group other than the portion of vehicles until a predetermined time elapses.

20. The communication control apparatus according to claim 1, wherein the communication control apparatus is provided in the node apparatus or is connected to the node apparatus.

21. A control method of a communication control apparatus for provision in a network that includes a plurality of base stations and a node apparatus that is for edge computing and is connected to the plurality of base stations, the method comprising:

acquiring, from the node apparatus, cell transition information that indicates transitions between cells by each vehicle that moves in a plurality of cells formed by the plurality of base stations;

determining a vehicle group that is made up of a plurality of vehicles and is to be subjected to transmission control, based on the acquired cell transition information; and controlling uplink transmission of data from the determined vehicle group, by limiting uplink transmission of path-dependent data, which is dependent on a movement path of a vehicle, to a portion of vehicles that belong to the vehicle group.

22. A non-transitory computer-readable storage medium storing a program for causing a computer to execute a control method of a communication control apparatus for provision in a network that includes a plurality of base stations and a node apparatus that is for edge computing and is connected to the plurality of base stations, the method comprising:

acquiring, from the node apparatus, cell transition information that indicates transitions between cells by each vehicle that moves in a plurality of cells formed by the plurality of base stations;

determining a vehicle group that is made up of a plurality of vehicles and is to be subjected to transmission control, based on the acquired cell transition information; and controlling uplink transmission of data from the determined vehicle group, by limiting uplink transmission of path-dependent data, which is dependent on a movement path of a vehicle, to a portion of vehicles that belong to the vehicle group.

\* \* \* \* \*